Oct. 6, 1925.

E. PISTOLESI 1,556,304

AIR PROPELLER

Filed Aug. 30, 1923

Inventor
Enrico Pistolesi
by (signature)
his Attorney

Patented Oct. 6, 1925.

1,556,304

UNITED STATES PATENT OFFICE.

ENRICO PISTOLESI, OF TIVOLI, ITALY.

AIR PROPELLER.

Application filed August 30, 1923. Serial No. 660,068.

*To all whom it may concern:*

Be it known that I, ENRICO PISTOLESI, mechanical engineer, a subject of the King of Italy, residing at Tivoli, Italy, whose post-office address is Viale Arnaldi No. 17, Tivoli, Italy, have invented certain new and useful Improvements in Air Propellers, of which the following is a specification.

The present invention relates to an air propeller with variable pitch and displaceable blades, the connection of the blades with the boss or hub being rigid, undeformable and capable of being subjected to remarkable tensile stresses.

The invention, of course, may have the most different applications, its principal object being however the construction of wood propeller screws with displaceable blades rigidly connected to a metal boss or hub so that their resistance is not less than that of screws all in one piece, with the advantage of being capable of regulating the position of the blades.

An example of a practical modification of the invention is illustrated in the accompanying drawings, in which.

Figure 3:
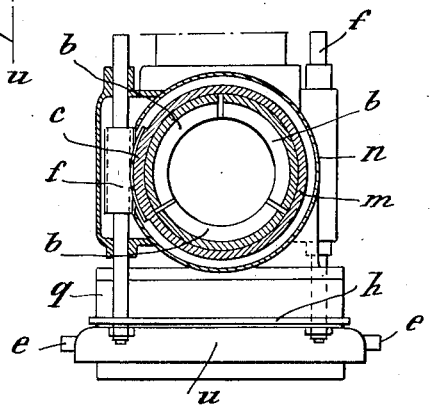
Fig. 3 is a cross section on line A—B of Fig. 1.

With reference to the said figures the connecting disposition consists in the wooden part of the blade —a— being notched flat headed or stepped, the conical steps —g— engaging in corresponding chambers provided in sleeve —b—, which may be formed of different parts (Fig. 3), liable to be united in a movable sleeve —m—. Both sleeves are preferably conical with the base towards the outside.

To keep sleeve —b— in its place a ring —v— pressing on the base of the internal sleeve —b— is screwed in the base of the movable sleeve —m—. In the opposite end the sleeve —m— is threaded to receive another clamp ring —w—, so that when tightening this ring against the base —p— of the blade's root a convenient pressure is obtained to fit the steps of sleeve —b— to the steps —g— of the blade's root —a—.

The conical form of steps —g— of the root is in the direction of the centrifugal force of the blade.

Both sleeves —b— and —m— are wedged in the screw boss —n— solidly with the rotation shaft —v—.

Said sleeves are kept in their place by an external ring —v'— screwed in the boss, this ring —v'— having thrust blocks with ball bearings —o—o'— to facilitate the rotation of the movable sleeve —m— and sleeve —b—. The movable sleeve —m— is driven by notched locking quadrants —c— (solidly with said sleeve) engaging with toothed racks —f—, solidly with the boss —n—.

Figure 1:
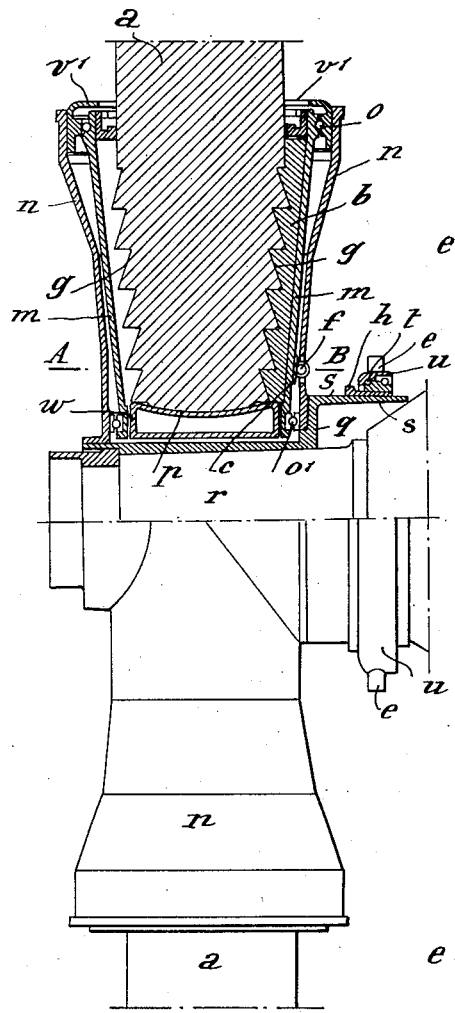
Fig. 1 shows a partially sectioned longitudinal view of the screw boss, in which the roots of the blades have been rammed down.
Figure 2:
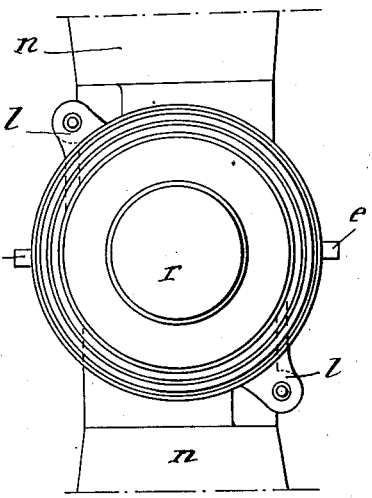
Fig. 2 shows a plan view of the screw boss seen from behind.

The toothed racks are conveniently fixed to a ring —h— or in projections —l— of the same (Fig. 2) the ring —h— being slidable on the part —s— of the body —q— of the boss; by this sliding the locking quadrants —c— are compelled to rotate and consequently produce the rotation of the movable sleeve —m—, of sleeve —b— solidly with sleeve —m—, and of the blades.

The variation of the screw pitch by displacing ring —h— is obtained through a double thrust bearing —t— applied to ring —h—, connected to an external ring —u— with pins —e— on its periphery, which pins being operated by a lever or other suitable means produce the displacement of ring —u—.

The movement of ring —u— may be obtained either by the pilot or by the very motor or in any other way spontaneously or automatically.

Having now particularly described and ascertained the nature of my said invention and in what manner the same is to be performed I declare that what I claim is:

1. In a propeller of the character described, having a hub and blades rotatable therein, the combination of a blade having a serrated conical root and an internally serrated conical sleeve adapted to receive said root, said serrations comprising conical surfaces having inclinations opposite to that of the conical root.

2. A propeller of the character described, as claimed in claim 1, said serrated sleeve comprising internal portions and an external member for holding said portions together, said member having internally threaded ends, and end pieces externally threaded to fit into said ends to retain said portions in position.

3. A propeller of the character described, as claimed in claim 1, said serrated sleeve comprising internal portions and an external member for holding said portions together, said member having internally threaded ends, and end pieces externally threaded to fit into said ends to retain said portions in position, the inner of said end pieces bearing against the base of the blade root to constitute additional support therefor.

4. In a propeller of the character described, the combination of a propeller blade having a conical root, and a conical sleeve to receive said root, said root and sleeve being provided with complementary engaging conical surfaces.

5. In a propeller of the character described, the combination of a propeller blade having a conical root, and a conical sleeve to receive said root, said root and sleeve being provided with complementary engaging conical surfaces having inclinations opposite to that of the conical root.

6. A propeller blade of the character described, comprising a conical root provided with a plurality of conical concentric ribs.

7. A propeller blade of the character described, comprising a conical root provided with a plurality of conical concentric ribs, the conical surfaces of which have inclinations opposite to that of the conical root.

In testimony whereof I have hereunto signed my name.

ING. ENRICO PISTOLESI.